US012221988B2

(12) United States Patent
Bueter

(10) Patent No.: US 12,221,988 B2
(45) Date of Patent: Feb. 11, 2025

(54) WORKING CYLINDER AND METHOD FOR THE PRODUCTION THEREOF

(71) Applicant: BÜMACH ENGINEERING INTERNATIONAL B.V., TA Emmen (NL)

(72) Inventor: Josef Bueter, Haren/Altenberge (DE)

(73) Assignee: Bümach Engineering International B.V., TA Emmen (NL)

( * ) Notice: Subject to any disclaimer, the term of this patent is extended or adjusted under 35 U.S.C. 154(b) by 0 days.

(21) Appl. No.: 18/573,099

(22) PCT Filed: Jun. 28, 2021

(86) PCT No.: PCT/DE2021/000111
§ 371 (c)(1),
(2) Date: Dec. 21, 2023

(87) PCT Pub. No.: WO2023/274432
PCT Pub. Date: Jan. 5, 2023

(65) Prior Publication Data
US 2024/0288009 A1 Aug. 29, 2024

(51) Int. Cl.
*F15B 15/14* (2006.01)

(52) U.S. Cl.
CPC ...... *F15B 15/1438* (2013.01); *F15B 15/1447* (2013.01)

(58) Field of Classification Search
CPC ... F15B 15/1438; F15B 15/1442; F16J 10/02; F16J 13/00
See application file for complete search history.

(56) References Cited

U.S. PATENT DOCUMENTS 2,274,458 A * 2/1942 Peterson .................. F16J 10/02 29/418
4,003,297 A * 1/1977 Mott .................. F15B 15/1438 92/163

(Continued)

FOREIGN PATENT DOCUMENTS

DE 1675299 A1 5/1971
DE 2916457 A1 12/1979

(Continued)

*Primary Examiner* — Michael Leslie
(74) *Attorney, Agent, or Firm* — Laurence A. Greenberg; Werner H. Stemer; Ralph E. Locher

(57) ABSTRACT

A working cylinder has a cylinder with a cylinder tube, and a piston unit, The cylinder has a coupling portion which has a closure part and cylinder tube end portion that has a threaded cylinder tube portion, a cylinder tube intermediate portion and a cylinder tube end. The closure part has an external thread and the threaded cylinder tube portion has an internal thread corresponding to the external thread. The external thread and the internal thread define a common threaded portion which is couples the closure part and the cylinder tube with a form fit. The cylinder tube end is connected to the closure part by a circumferential ring weld seam configured as a laser-produced ring weld seam and defines a sealing plane which is tight to pressure medium. In an operating state under load alleviation, the common threaded portion does not absorb an axial tensile force, and in the operating state under load, the ring weld seam and the common threaded portion each absorb an axial tensile force. There is a method for the production of the cylinder.

8 Claims, 6 Drawing Sheets

(56) References Cited

U.S. PATENT DOCUMENTS

| | | | | | |
|---|---|---|---|---|---|
| 4,324,171 | A * | 4/1982 | Gaylord | F16J 10/02 | 92/260 |
| 5,487,326 | A * | 1/1996 | Owens | F15B 15/1442 | 92/128 |
| 6,196,112 | B1 * | 3/2001 | Buter | F15B 15/1442 | 92/169.1 |
| 6,964,221 | B2 * | 11/2005 | Mickelson | B23P 15/10 | 92/128 |
| 10,865,815 | B2 * | 12/2020 | Bueter | F16J 15/04 | |
| 11,131,330 | B1 * | 9/2021 | Davis | F15B 15/1438 | |
| 11,958,125 | B2 * | 4/2024 | Nagai | B23K 20/12 | |
| 11,988,233 | B2 * | 5/2024 | Bueter | F15B 15/1438 | |
| 2003/0116012 | A1 | 6/2003 | Mickelson | | |
| 2004/0143953 | A1 | 7/2004 | Mickelson et al. | | |
| 2022/0397129 | A1 | 12/2022 | Bueter | | |

FOREIGN PATENT DOCUMENTS

| | | | |
|---|---|---|---|
| EP | 3559480 | A1 | 10/2019 |
| WO | 2021089072 | A1 | 5/2021 |

* cited by examiner

WORKING CYLINDER AND METHOD FOR THE PRODUCTION THEREOF

FIELD AND BACKGROUND OF THE INVENTION

The invention relates to a working cylinder, in particular a hydraulic working cylinder. Furthermore, the invention relates to a method for producing such a working cylinder.

Working cylinders as such are known from the prior art. Normally, such working cylinders have a cylinder tube, closure parts coupled thereto and a piston unit.

In the prior art, it is known to produce such working cylinders, for example, by screwing the closure parts to the cylinder tube. Therefore, such working cylinders are also known as screw-type cylinders.

Another solution known in the state of the art is to weld the cylinder tube and closure parts together.

Furthermore, a combined solution is known from the state of the art in which the base closure part is connected to the cylinder tube by MAG welding and then only the guide closure part is screwed.

The threads of the cylinder tube and closure parts are usually produced in a machining process.

Screw-type cylinders and cylinders with screwing of only one closure part and MAG welding of the other closure part are provided in high quality according to the state of the art and have proven to be premium and reliable products.

A production-related disadvantage is the fact that the cylinder tube, in particular, requires an increased material thickness, i.e. the tube wall thickness, for the thread to be machined in a subtractive process because the thread inevitably weakens the cylinder tube. However, this leads to a tube wall thickness that is considerably oversized for absorbing the forces during operation, in particular the forces applied by the operating pressure of the fluid. This disadvantageously results in increasing material consumption and an increased final weight of the working cylinder. Another disadvantage of screw-type working cylinders is the fact that a specific thread length must be provided in order to be able to absorb the high axial forces resulting from the operating pressure of a fluid and also from the pre-stress during screwing. Due to the minimum thread length the length dimensions also increase, which can, depending on the installation situation, add another disadvantage apart from the increased material consumption.

SUMMARY OF THE INVENTION

The task of the invention is to provide a working cylinder that is highly reliable and can be produced in a material-saving and cost-effective manner. Furthermore, it is the task of the invention to disclose a method for producing such a working cylinder.

The task is solved with regard to the working cylinder by the features listed in the independent device claim and with regard to the method for producing such a working cylinder by the features listed in the independent method claim. Preferred embodiments result from the corresponding dependent claims.

The working cylinder according to the invention has a cylinder and a piston unit as basic elements and is connected to the cylinder tube in a particular manner by a special coupling of at least one closure part.

According to the invention, the cylinder has a cylinder tube, a closure part and a further closure part.

As customary, the cylinder tube has a cylinder tube end and a further cylinder tube end and thus two opposing cylinder tube ends. The closure parts are arranged at the cylinder tube ends, i.e. the closure part is arranged at the cylinder tube end and the further closure part is arranged at the further cylinder tube end. The cylinder tube end and the further cylinder tube end are hereinafter collectively referred to as the cylinder tube ends and the closure part and the further closure part are hereinafter collectively referred to as the closure parts. The cylinder tube and the closure parts arranged thereto form a cylinder interior.

As a further basic element, the piston unit forms at least one working chamber in the cylinder interior. Preferably, the piston unit is designed as an assembly of piston and piston rod, wherein the piston rod slidingly passes through one of the closure parts, which represents then a guide closure part. However, the piston unit can also exist in the form, for example, of a plunger piston of a plunger cylinder or of a piston unit of a cylinder which has a continuous piston rod and thus two equally large effective surfaces for extension and retraction.

In particular, the working cylinder according to the invention is characterized by a specially designed coupling between the cylinder tube and the closure part. The cylinder tube and the closure part are also collectively referred to as the coupling partners.

For this design, the cylinder has a coupling portion. The coupling portion is formed by the closure part and the cylinder tube end portion.

The cylinder tube end portion has a threaded cylinder tube portion, an intermediate cylinder tube portion and a cylinder tube end.

The closure part has an external thread and the threaded cylinder tube portion has an internal thread corresponding to the external thread, wherein the external thread and the internal thread together form a common threaded portion. The external thread and internal thread engage with each other in the common threaded portion.

The threaded portion is designed to couple the closure part and the cylinder tube in a form fit manner and thus, in particular, to absorb axial forces resulting from the operating pressure of the pressure medium when the working cylinder according to the invention is used as intended.

In addition, the cylinder tube end is connected to the closure part in a substance-locking manner (integral bonding) at an adaptation body end on the cylinder tube side by means of a circumferential ring weld seam. The ring weld seam is designed as a laser ring weld seam. The ring weld seam forms a sealing plane that is tight to pressure media. The sealing plane tight to pressure media separates the working chamber from the environment and prevents the pressure medium from escaping.

The working cylinder according to the invention is designed to assume an operating state under load relief or an operating state under load.

The operating state under load relief is understood to be the operating state in which no or only a low operating pressure of the pressure medium is applied.

According to the invention, the coupling portion (portion) is designed such that in the operating state under load relief, axial tensile force is not absorbed by the common threaded portion. Axial tensile force is understood to be a force directed from the closure part in the distal axial direction, i.e. away from the centre of the cylinder.

The underlying fact is that the external thread and the internal thread exhibit a slight axial movement relative to each other, and in case of working cylinders this is also known as breathing. This slight axial relative movement is hereinafter referred to as an axial clearance. With a tensile force, the external thread of the closure part is in a distal clearance end position, and with a compressive force, i.e. a force acting in the direction of the cylinder centre, it is in a proximal clearance end position. Between these positions, there is the intermediate clearance position. Possible axial tensile forces are absorbed exclusively by the ring weld seam in the operating state under load relief. By definition, axial tensile forces are not absorbed by the common threaded portion in the operating state under load relief, wherein either axial forces are not absorbed by the common threaded portion and the closure part is located in an intermediate clearance position or, conversely, axial compressive forces can be absorbed.

The operating state under load is understood to be the operating state in which the full or a high operating pressure of the pressure medium is applied.

The coupling portion is designed in such a manner that in the operating state under load the ring weld seam and the common threaded portion each absorb an axial tensile force. This means that one portion of the high axial tensile forces acting on the closure part due to the operating pressure of the pressure medium is absorbed by the ring weld seam and another portion is absorbed by the common threaded portion. According to the invention, this force distribution is achieved by the elastic strain of the intermediate cylinder tube portion, which is located between the threaded cylinder tube portion and the cylinder tube end, during a transition from the operating state under load relief to the operating state under load and with the associated increase of the axial tensile force. This change in length within the elasticity limit has the result that the common threaded portion is guided into the distal clearance end position and absorbs an axial tensile force from this state onwards. From this state onwards, the intermediate cylinder tube portion is not elastically strained any longer, and the ring weld seam as a substance-locking coupling and the common threaded portion as a form-fit coupling are jointly involved in absorbing the axial tensile forces.

According to the invention, the delimitation of the operating state under load relief and the operating state under load is understood to be the state in which the operating pressure of the pressure medium is so high that the common threaded portion begins to absorb a portion of the axial tensile forces.

The solution according to the invention has in particular the advantages described below.

A first particular advantage is that the axial tensile force, which has to be absorbed by the common threaded portion as a result of the operating pressure of the pressure medium during the intended use, is significantly reduced by two effects according to the invention.

Firstly, the axial pre-stress which is caused by tightening the screw connection by pressing the ring contact surfaces of the cylinder tube and closure part, as is the case with state-of-the-art screw-type working cylinders, is advantageously eliminated. This axial pre-stress needs to be absorbed in addition to the forces from the operating pressure and reduces the forces from the operating pressure that can be maximally absorbed in screw-type cylinders according to the state of the art. According to the invention, thus only the axial tensile forces resulting from the operating pressure need to be absorbed by the common threaded portion.

Secondly, the axial tensile forces resulting from the operating pressure are then additionally reduced by a force portion absorbed by the ring weld seam.

This is based on the fact that, as another particular advantage, the force absorption of the axial tensile load at high operating pressures can be distributed to the ring weld seam on the one hand and to the common threaded portion on the other.

Due to the force distribution, the common threaded portion is less stressed than in screw-type cylinders according to the state of the art. This fact has the advantage that the common threaded portion can be designed shorter or the cylinder tube can be designed with a thinner wall. These options save expensive cylinder tube material, reduce the time required for machining the thread and also allows smaller sizes of the working cylinder with the same stroke.

The force distribution has the additional effect that, compared to welding cylinders of the prior art, the ring weld seam is also subject to less stress. This fact advantageously allows to use thinner-walled cylinder tubes, and thus material can be saved and the weight of the working cylinder can be reduced.

Here, it is a particularly advantageous that the maximum axial force on the ring weld seam can be set by the geometry of the intermediate cylinder tube portion.

In particular, the ratio of length and wall thickness can be selected in such an advantageous manner that the elasticity limit is reliably kept and the maximum axial force on the ring weld seam is limited.

Compared to screw-type cylinders, the need for an unscrewing protection is also advantageously eliminated, as this is taken over by the functional integration of the ring weld seam in.

According to a first advantageous further development, the working cylinder according to the invention is characterized in that in the operating state under load relief, the intermediate cylinder tube portion has a tensile pre-stress and the common threaded portion absorbs an axial compressive force. According to this further development, the common threaded portion is in a proximal clearance end position in the operating state under load relief. Thus, this further 9 development provides a solution in which the path of the elastic strain of the intermediate cylinder tube portion will be realized as long as possible. In this way, a high portion of the axial tensile force can be transmitted via the ring weld seam.

In a further advantageous development, the working cylinder is characterized in that the intermediate cylinder tube portion is designed for axial strain within its elasticity limit when the operating state under load relief changes to the operating state under load.

The intermediate cylinder tube portion can also be designed to have a wall taper, for example.

Furthermore, the intermediate cylinder tube portion can be designed such that it is fully or partially integrated into the threaded cylinder tube portion. The internal thread of the cylinder tube portion can then preferably have a thread pitch in the distal direction which is a slightly degressive pitch in a stress-free state and a linear pitch in a state of elastic strain. According to this further development, the flanks of all thread turns are fully in contact only in the operating state under load. This advantageously achieves an even further structural reduction in the length of the cylinder tube end portion. Alternatively or cumulatively, the external thread of the closure part can also have this design.

According to a further advantageous development, the working cylinder is characterized in that the intermediate cylinder tube portion has a wall taper.

A wall taper is understood to mean a reduction in the wall thickness of the cylinder tube in the area of the intermediate cylinder tube portion.

Advantageously, the wall thickness of the intermediate cylinder tube portion is 60% or less, particularly preferably 40% or less of the wall thickness of the rest of the cylinder tube. Preferably, the length of the intermediate cylinder tube portion in the area of the wall taper is also at least three times, in a particularly preferable design at least five times, the wall thickness of the cylinder tube in the 9 area of the wall taper. The wall taper provides a surprisingly simple but reliable solution for reducing the load on the ring weld seam. This is based on the fact that in the operating state under load the intermediate cylinder tube portion is strained in an axially elastic manner and transmits a tensile force to the ring weld seam. The thinner the wall thickness is selected, the lower is the transmitted force with the same elastic strain state.

According to a further advantageous development, the working cylinder is characterized in that the ring weld seam has a ring weld seam depth which has a ratio of 1.1 to 2.5 to a cylinder tube wall thickness.

In this further development, the ring weld seam has an inclination relative to the transverse plane which is orthogonal to the main longitudinal axis. This results in a depth of the ring weld seam that exceeds the cylinder tube wall thickness, wherein, depending on the angle of inclination, it is 1.1 to 2.5 times the cylinder tube wall thickness. In this way, a larger joint area and thus a higher strength of the substance-locking connection of the closure part with the cylinder tube at its cylinder tube end is provided in a particularly advantageous manner.

According to another advantageous further development, the working cylinder is characterized in that the ring weld seam has a ring weld seam centre axis which has a ring weld seam inclination angle alpha of 20 to 70 degrees relative to a main longitudinal axis of the cylinder tube The centre axis of the ring weld seam, which is V-shaped in its cross portion, is inclined relative to the transverse plane and includes the ring weld seam inclination angle alpha of 20 to 70 degrees relative to the transverse plane. It has been found that an inclination in this area achieves an additional increase in strength on the one hand, in that the inclination favourably distributes the components of the multi-axial load on the weld seam caused by tensile stresses and buckling stresses and, on the other hand, there is sufficiently low energy per unit length to avoid, depending on the intended force distribution, undesirable excessive heating of the intermediate cylinder tube portion during welding.

According to another further development, the working cylinder has a further coupling portion at its further cylinder tube end portion, which is designed like the coupling portion according to the invention. Therefore, the contents of the description of the coupling portion according to the invention and of its advantages also apply accordingly to the further coupling portion.

According to a further aspect, the invention relates to a method of producing a working cylinder according to the invention.

The working cylinder produced by this method has the features described above. Thus, the description parts relating to the working cylinder according to the invention also apply in a correspondingly supplementary manner to the method according to the invention.

The method according to the invention comprises the following process steps:

a) screwing the cylinder tube with its cylinder tube end portion onto the closure part and producing an engagement between the internal thread of the threaded cylinder tube portion and the external thread of the closure part, and producing the common threaded portion,
b) establishing a pressure contact at an axial ring contact surface between the cylinder tube end and the closure part,
c) applying a tightening torque, generating an axial compressive force and producing an axial compression of the intermediate cylinder tube portion,
d) carrying out laser welding of the cylinder tube end and the closure part at the axial ring contact surface with thermal softening and deformation of the cylinder tube end and the closure part in an area close to the axial ring contact surface with thermal expansion and simultaneous relaxation of the axial compression of the intermediate cylinder tube portion,
e) cooling with solidification of the cylinder tube end and the closure part in an area close to the axial ring contact surface and forming the ring weld seam and axial thermal contraction of the intermediate cylinder tube portion.

The process steps are described in more detail below.

a) Screwing the cylinder tube with its cylinder tube end portion onto the closure part and producing an engagement between the internal thread of the threaded cylinder tube portion and the external thread of the closure part, and producing the common threaded portion In process step a), the external thread of the closure part and the internal thread of the threaded cylinder tube portion are brought into engagement with each other. Then, screwing is performed so that the common threaded portion is produced. Screwing is continued until the cylinder tube end of cylinder tube end portion is in contact with the closure part.

b) Establishing a pressure contact at an axial ring contact surface between the cylinder tube end and the closure part The cylinder tube end has a distally orientated axial cylinder tube ring surface and the closure part has a proximally orientated axial closure part ring surface which are opposite each other and brought into pressure contact with each other in process step b). Then, both ring surfaces form the common ring contact surface.

c) Applying a tightening torque, generating an axial compressive force and producing an axial compression of the intermediate cylinder tube portion In process step c), a tightening torque is applied. This simultaneously generates an axial compressive force on the ring contact surface so that a high surface pressure is achieved there. The thread is in the distal clearance end position. By continuing to tighten the screw connection the intermediate cylinder tube portion is axially compressed, wherein this compression is preferably exclusively within the elasticity range. After this process step, the working cylinder is in a state of axial pre-stress. The degree of compression can be used to influence the subsequent distribution of axial tensile forces between the ring weld seam and the common threaded portion. With increasing compression, the portion of the axial tensile force, which is transmitted via the ring weld seam in the finished working cylinder, increases.

d) Carrying out laser welding of the cylinder tube end and the closure part on the axial ring contact surface with thermal softening and deformation of the cylinder tube end and the closure part in an area close to the axial ring contact surface with thermal expansion and simultaneous relaxation of the axial compression of the intermediate cylinder tube portion In process step d), the welding laser is applied in the area of the axial ring contact surface. The welding energy introduced by the laser beam causes heating and thus thermal softening of the material of the cylinder tube end and of the closure part in the area close to the axial ring contact surface. This softening causes the material to yield and the elastic compression of the intermediate cylinder tube portion relaxes. Furthermore, heat is also applied to the intermediate cylinder tube portion due to thermal conduction from the area close to the cylinder tube end and this has the effect of thermal expansion. The change in length due to the thermal expansion is not impeded by the softening of the material in the laser welding zone, i.e. in the area close to the axial ring contact surface, so that a state free of axial tension can be achieved. The later distribution of the axial tensile forces to be absorbed by the ring weld seam and the common threaded portion can be specifically influenced by the degree of heat applied to the intermediate cylinder tube portion. Increased heating increases the portion of the axial tensile force transmitted via the ring weld seam in the finished working cylinder. And, the intermediate cylinder tube can be additionally heated by the heat input generated by laser welding anyway.

By pressing the materials on the ring contact surface in process step c), a particularly reliable substance-locking connection is also advantageously achieved during welding in process step d) and disadvantageous air inclusions are avoided. This results in a highly robust ring weld seam.

e) Cooling with solidification of the cylinder tube end and the closure part in the area close to the axial ring contact surface and forming the ring weld seam axial thermal contraction of the intermediate cylinder tube portion In process step e), heat is dissipated so that the softened material solidifies and the ring weld seam is formed as a laser weld seam in the area of the axial ring contact surface, thus forming a substance-locking connection between the closure part and the cylinder tube. During continued cooling even after the ring weld seam has been formed, the cylinder tube end portion, and in particular its intermediate cylinder tube portion, contracts. Due to the axial portion of this thermal contraction, the common threaded portion is led from the state of the distal clearance end position to the clearance mid-position state or—depending on the length of the thermal contraction—even to the proximal clearance end position state. Thus, the common threaded portion is reliably free of axial tensile pre-stress.

According to an advantageous further development, the process is characterized in that process step e) is carried out as process step e1) and that in process step e1) the axial thermal contraction is continued until an axial tensile pre-stress is generated in the intermediate cylinder tube portion.

According to this further development, the common threaded portion is then in a proximal clearance end position. This particular further development has the advantage that, when an axial force is applied as a result of the operating pressure, the tensile force is initially completely absorbed by the ring weld seam and the common threaded portion remains relieved of the tensile force. If the elastic strain of the intermediate cylinder tube portion continues with an increase in the axial tensile force, the common threaded portion first reaches the clearance end position and only afterwards the distal clearance end position. The transmission of the force via the common threaded portion will only be started when the force further increases. At this point, the force transmission starts to be distributed between the ring weld seam and the common threaded portion. Whereas the force transmission via the ring weld seam does not substantially increase from this point onwards, a further increase in the axial tensile force is transmitted via the common threaded portion.

The invention is described as an exemplary embodiment in more detail by means of the following figures. They show:

DETAILED DESCRIPTION OF THE INVENTION

Figure 1:
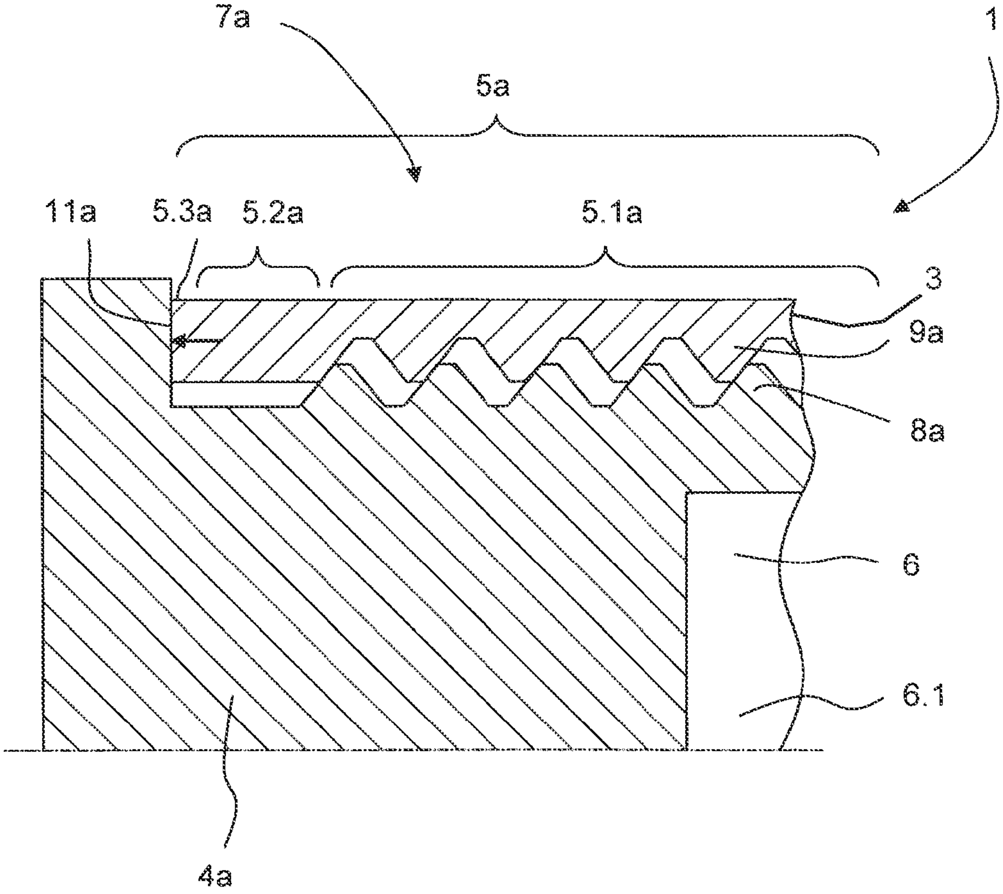
FIG. 1 Coupling portion of the working cylinder after process steps a) to c)—schematic sectional view FIG. 2 Coupling portion of the working cylinder after process step d)—schematic sectional view FIG. 3 Coupling portion of the working cylinder after process step e)—schematic sectional view FIG. 4 Coupling portion of the working cylinder in the transition from the operating state under load relief to the operating state under load—schematic sectional view FIG. 5 Coupling portion of the working cylinder in the operating state under load—schematic sectional view FIG. 6 Further coupling portion of the working cylinder in the operating state under load—schematic sectional view.

The same reference numerals in the various figures refer to the same features or components. The reference numerals will also be used in the description, if they are not included in the relevant figure.

The figures show an exemplary embodiment of the working cylinder and an exemplary embodiment of the method in the various process steps.

FIG. 1 shows the working cylinder in the area of the cylinder tube end portion 5*a* and the closure part 4*a* in the state when process steps a) to c) have been carried out. The cylinder tube end portion 5*a* of the cylinder tube 3 is divided in distal sequence into the threaded cylinder tube portion 5.1*a*, the intermediate cylinder tube portion 5.2*a* and the cylinder tube end 5.3*a*. The internal thread 9*a* of the threaded cylinder tube portion 5.1*a* and the external thread 8*a* of the closure part 4*a* have been brought into engagement in process step a) and now they form the common threaded portion. Furthermore, in process step b), pressure contact between the cylinder tube end 5.3*a* and the closure part 4*a* has been established at an axial ring contact surface 11*a* by continued screwing. In process step c), an axial compressive force has been generated by the application of a tightening torque, as indicated by the double arrow. The common threaded portion has been brought into the distal clearance end position state and the intermediate cylinder tube portion 5.2*a* has been tensioned between the threaded cylinder tube portion 5.1*a* and the axial ring contact surface 11*a*, thus producing axial compression of the intermediate cylinder tube portion 5.2*a* as its elastic deformation. The geometry of the pairing of the internal thread 9*a* and external thread 8*a* is shown schematically and greatly exaggerated in all FIGS. in order to better visualize the clearance positions. In the present exemplary embodiment, the closure part 4*a* is designed as a base closure part which, together with the cylinder tube 3, forms the working chamber 6.1, in this case the piston chamber, of the cylinder interior 6.

Figure 2:
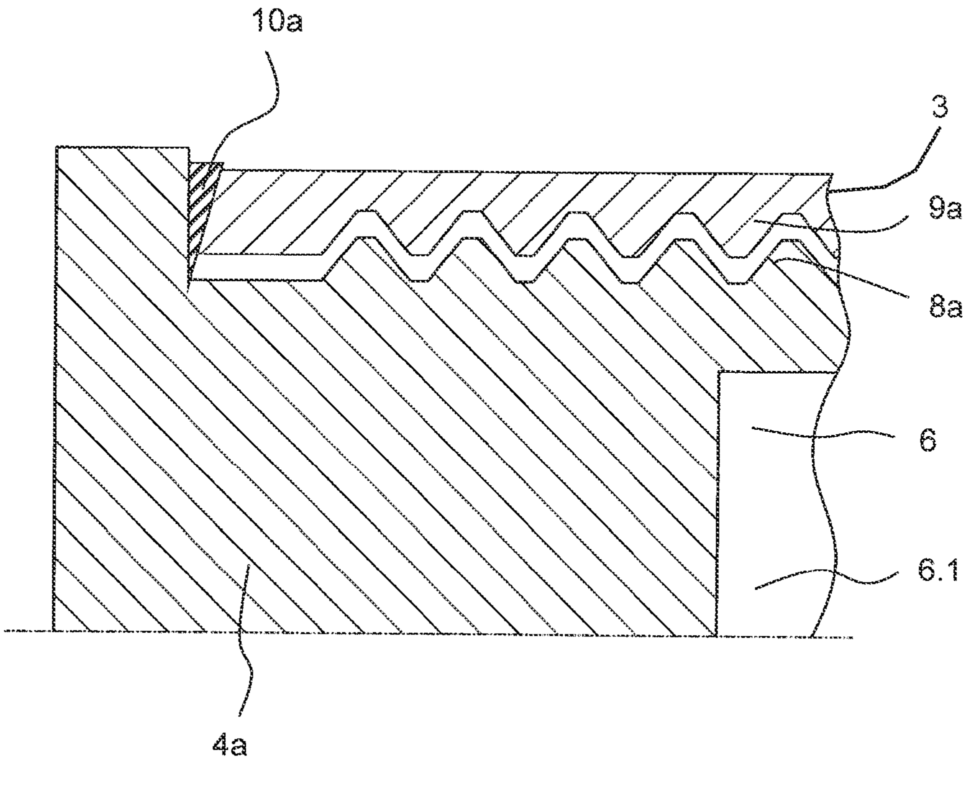

FIG. 2 shows the working cylinder when process step d) has been carried out and at the start of process step e). The exposure to a laser in the area of the axial ring contact surface 11*a* has softened the material of the closure part 4*a* and the cylinder tube 3 at the cylinder tube end 5.3*a*, which has deformed as a result of the compressive stress and thus enabled axial elongation of the intermediate cylinder tube portion 5.2*a* under axial elastic re-deformation. Now, the ring weld seam 10*a* has been produced in the area of the previous axial ring contact surface 11*a*. The intermediate cylinder tube portion 5.2*a* is stress-free now and the common threaded portion is in a clearance mid-position due to its incipient axial thermal contraction.

Figure 3:
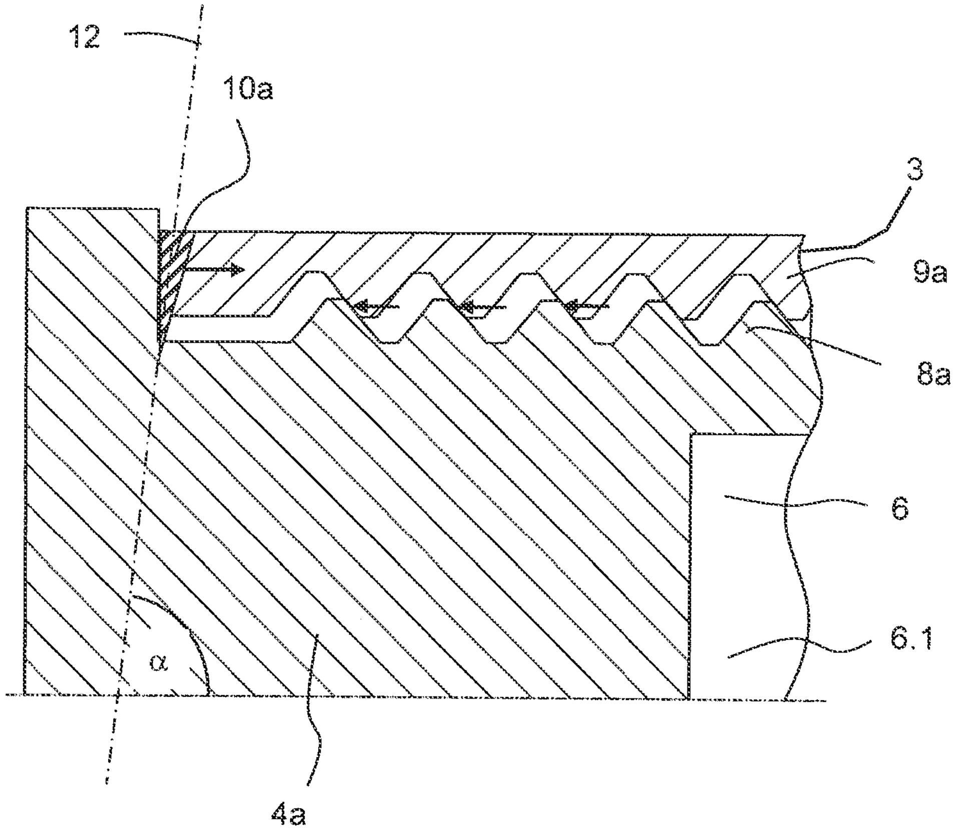

FIG. 3 shows the working cylinder in the variant of tensile pre-stress of the intermediate cylinder tube portion 5.2*a* after all process steps a) to e) have been completed. After continuing axial thermal contraction of the intermediate cylinder tube portion 5.2*a* following continued cooling in process step e), the common threaded portion is in the proximal clearance end position. The tensile force acting on the ring weld seam 10*a* is indicated by the arrow on the ring weld seam 10*a*. The ring weld seam 10*a* has a center axis 12 that is at an inclination angle α to the longitudinal axis of the cylinder 1. The three opposing short arrows at the thread flanks represent the transmission of the axial compressive force via the common threaded portion.

In the operating state under load relief, low axial forces are thus transmitted exclusively via the ring weld seam 10*a*.

Figure 4:
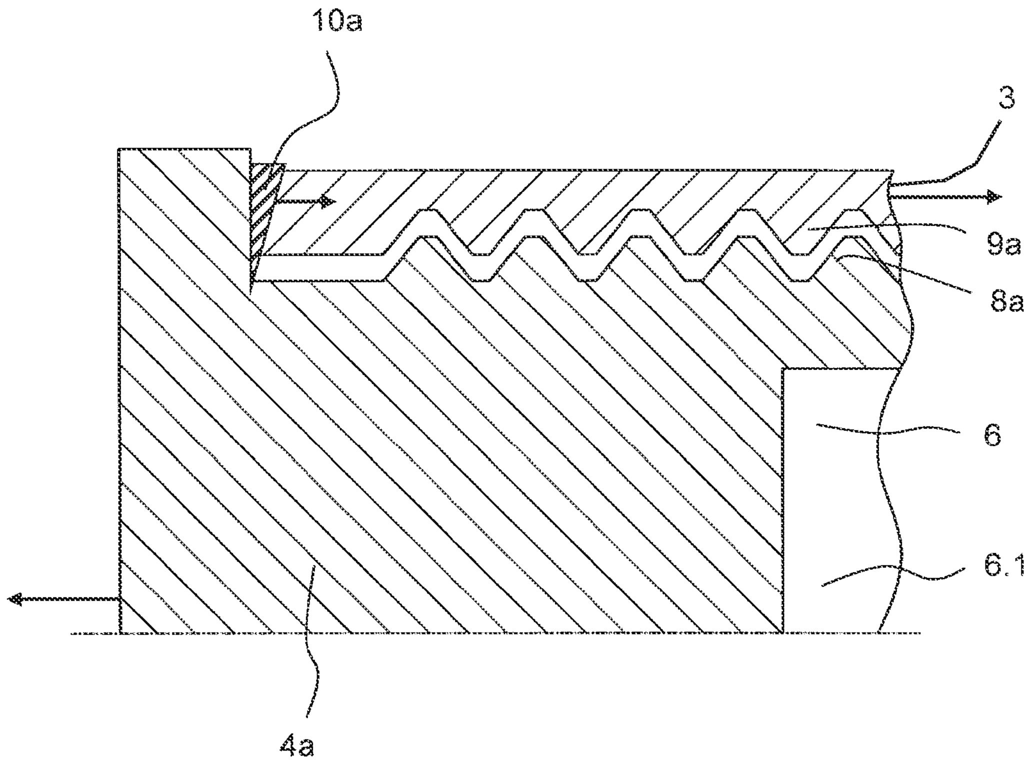
Figure 5:
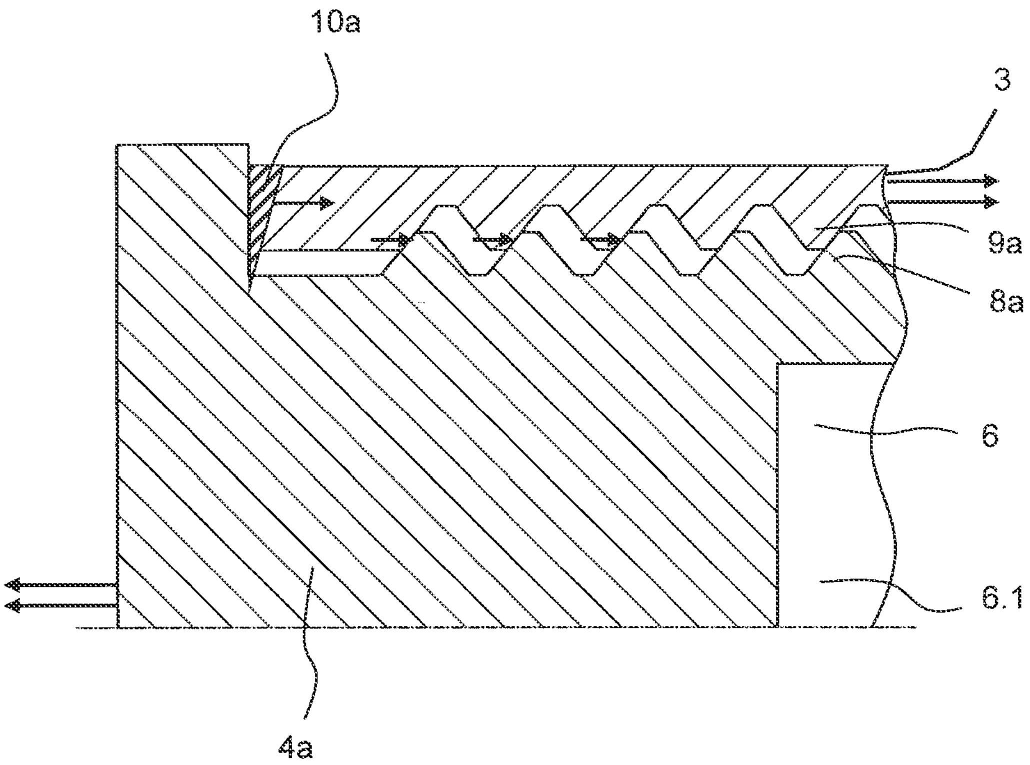

FIG. 4 and FIG. 5 show the working cylinder under load. The illustrations in FIG. 4 and FIG. 5 are based on the fact that the working cylinder in the present exemplary embodiment is provided with fastening modules both on the piston rod and on the base closure part (not shown), as is usually the case. A fastening module is understood to be a component for transmitting force from the working cylinder to components of an application device. In a common design, the fastening module has a bore hole—often referred to as an eye—into which a locking element such as a bolt can be inserted. The locking element connects the fastening module on the piston rod side to a component of an application device in a form fit manner and ensures force transmission during operation. In particular, such a fastening module can be designed as a spherical bearing. FIG. 4 and FIG. 5 show the case in which the pressure medium is pressurized in the piston rod chamber and is relaxed in the piston chamber. Thus, the working cylinder generates a tensile force between the fastening modules in order to perform a retraction movement. The pressure acting on the inner ring surface of the further closure part 4*b*—in this case the guide closure part—causes a distal axial force that is transmitted to the cylinder tube 3 and from it to the coupling portion 7*a*. There, the tensile force, which has been transmitted by the fastening module of the closure part 4*a* to the application device, is applied as an opposing tensile force to the closure part 4*a*.

FIG. 4 shows the working cylinder in a state of transition from the operating state under load relief to the operating state under load. The tensile force transmitted via the cylinder tube 3 is indicated by the arrow on the cylinder tube 3 and the tensile force acting on the closure part 4*a* via the fastening module is indicated by the arrow pointing towards the opposite direction. The intermediate cylinder tube portion 5.2*a* is axially strained as an elastic deformation. However, the pressure of the pressure medium is not yet so high that the maximum axial elongation of the intermediate cylinder tube portion 5.2*a* is reached and that the common threaded portion is in a clearance mid-position. The force from the pressure of the pressure medium is still exclusively absorbed by the ring weld seam 10*a*.

FIG. 5 shows the working cylinder in the operating state under load. Due to the high axial forces—illustrated by the double arrows—the intermediate cylinder tube portion is elastically elongated at high or full operating pressure of the pressure medium in the piston rod chamber to such an extent that the common threaded portion has been brought into the distal clearance end position. Additional forces are now transmitted between the external thread 8*a* and the internal thread 9*a*. The three short arrows on the thread flanks indicate the transmission of the axial tensile force via the common threaded portion. Due to the force transmission via the common threaded portion, the intermediate cylinder tube portion 5.2*a* cannot extend any longer, which prevents the ring weld seam 10*a* from being overloaded. The total transmitted tensile force is now divided into the force transmitted via the ring weld seam and the force transmitted via the common threaded portion.

Figure 6:
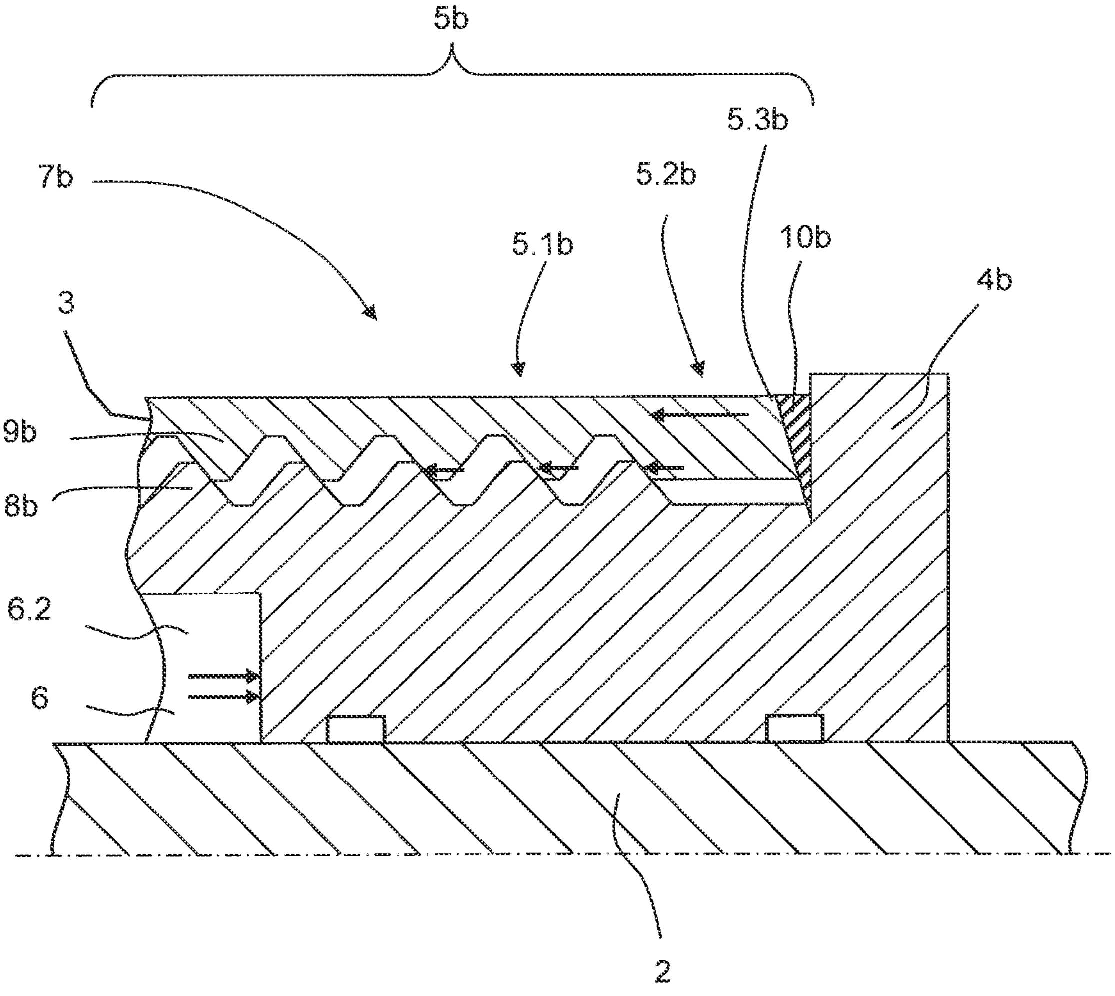

FIG. 6 shows an exemplary embodiment of a working cylinder that has a further coupling portion 7*b*, and the operating state under load is also shown here.

In the example shown in FIG. 6, the further closure part 4*b* is a guide closure part through which a piston rod of the piston unit 2 passes. The further working chamber 6.2 is therefore the piston rod chamber. The further cylinder tube end portion 5*b* is designed like the cylinder end portion 5*a* and has the further threaded cylinder tube portion 5.1*b*, the further intermediate cylinder tube portion 5.2*b* and the further cylinder tube end 5.3*b*. The further external thread 8*b* and the further internal thread 9*b* are engaged and form the further common threaded portion. At the same time, the cylinder tube 3 and the further closure part 4*b* are connected in a form fit manner via the further circumferential ring weld seam 10*b*. The pressure medium in the further working chamber 6.2 effectuates an axial distal force on the further closure part 4*b* due to the high operating pressure that acts on the inner ring surface of the further closure part 4*b* in the operating state under load—indicated by the two parallel arrows. Firstly, this force is transmitted to the cylinder tube 3 via the further ring weld seam 10*b*—indicated by the long arrow in the further intermediate cylinder tube portion 5.2*b*. This generates a tensile force in the area of the further intermediate cylinder tube portion 5.2*b* so that this portion is elastically strained. Secondly, due to the resulting axial displacement between the further internal thread 9*b* and the further external thread 8*b*, forces are also transmitted to the cylinder tube 3 via the further common threaded portion—indicated by the three short arrows at the thread flanks. In addition, the descriptions of the structure and function of the coupling portion 7*a* shown in FIGS. 1 to 5 also apply accordingly to the further coupling portion 7*b* shown in FIG. 6.

LIST OF REFERENCE NUMERALS

1 Cylinder
2 Piston unit
3 Cylinder tube
4*a* Closure part
4*b* Further closure part
5*a* Cylinder tube end portion
5.1*a* Threaded cylinder tube portion
5.2*a* Intermediate cylinder tube portion
5.3*a* Cylinder tube end
5*b* Further cylinder tube end portion
5.1*b* Further threaded cylinder tube portion

5.2*b* Further intermediate cylinder tube portion
5.3*b* Further cylinder tube end
6 Cylinder interior
6.1 Working chamber
6.2 Further working chamber
7*a* Coupling portion
7*b* Further coupling portion
8*a* External thread
8*b* Further external thread
9*a* Internal thread
9*b* Further internal thread
10*a* Ring weld seam
10*b* Further ring weld seam
11*a* Axial ring contact surface
12 Centre axis of the ring weld seam

The invention claimed is:

1. A working cylinder, comprising:

a cylinder having a cylinder tube, a closure part with an external thread, and a further closure part, said cylinder tube having a cylinder tube end portion and a further cylinder tube end portion, said closure part being arranged on the cylinder tube end portion and the further closure part being arranged on the further cylinder tube end portion, the cylinder tube end portion having a threaded cylinder tube portion with an internal thread corresponding to the external thread, an intermediate cylinder tube portion and a cylinder tube end, said cylinder tube and the closure parts defining a cylinder interior, the cylinder having a coupling portion including the closure part and the cylinder tube end portion, the external thread and the internal thread defining a common threaded portion constructed for connecting the closure part and the cylinder tube in a form fit;

a piston unit defining at least one working chamber in the cylinder interior;

the cylinder tube end being connected to the closure part by a circumferential ring weld seam in a substance lock, the ring weld seam being constructed as a laser ring weld seam and defining a pressurized sealing plane being tight to a pressure media, the working cylinder being constructed for assuming an operating state under load relief or an operating state under load, in the operating state under load relief, the common threaded portion does not absorb any axial tensile force, in the operating state under load, the ring weld seam and the common threaded portion each absorbing an axial tensile force.

2. The working cylinder according to claim 1, wherein in the operating state under load relief, the intermediate cylinder tube portion has a tensile pre-stress and the common threaded portion absorbs an axial compressive force.

3. The working cylinder according to claim 1 wherein the intermediate cylinder tube portion is constructed for axial strain within an elasticity limit thereof when the operating state under load relief changes to the operating state under load.

4. The working cylinder according to claim 1, wherein the ring weld seam has a ring weld seam depth which has a ratio of 1.1 to 2.5 to a cylinder tube wall thickness.

5. The working cylinder according to claim 1, wherein the ring weld seam has a ring weld seam center axis with a ring weld seam inclination angle alpha between 20 and 70 degrees relative to a main longitudinal axis of the cylinder tube.

6. The working cylinder according to claim 1, wherein the piston unit defines a further working chamber in the cylinder interior, the cylinder has a further coupling portion, which has the further closure part and the further cylinder tube end portion, the further cylinder tube end portion includes a further threaded cylinder tube portion, a further intermediate cylinder tube portion and a further cylinder tube end, the further closure part has a further external thread and the further threaded cylinder tube portion has a further internal thread corresponding to the further external thread, the further external thread and the further internal thread define a further common threaded portion constructed to couple the further closure part and the cylinder tube in a form fit, the further cylinder tube end is connected to the further closure part in a substance lock by a further circumferential ring weld seam, the further circumferential ring weld seam is constructed as a laser ring weld seam and defines a sealing plane tight to pressure media, in the operating state under load relief the further common threaded end portion does not absorb any axial tensile force, in the operating state under load, the further circumferential ring weld seam and the further common threaded portion each absorb an axial tensile force.

7. A method of manufacturing a working cylinder, according to claim 1, comprising:

a) screwing the cylinder tube with the cylinder tube end portion onto the closure part and producing an engagement between the internal thread of the threaded cylinder tube portion and the external thread of the closure part, and establishing the common threaded portion;

b) establishing a pressure contact at an axial ring contact surface between the cylinder tube end and the closure part;

c) applying a tightening torque and generating an axial compressive force for producing an axial compression of the intermediate cylinder tube portion;

d) carrying out laser welding of the cylinder tube end and the closure part at the axial ring contact surface with thermal softening and deformation of the cylinder tube end and the closure part in an area at the axial ring contact surface with thermal expansion and simultaneous relaxation of the axial compression of the intermediate cylinder tube portion;

e) cooling with solidification of the cylinder tube end and the closure part in an area at the axial ring contact surface and forming the ring weld seam and axial thermal contraction of the intermediate cylinder tube portion.

8. The method for manufacturing a working cylinder according to claim 6, wherein process step e) is carried out as process step e1) and in that in process step e1) the axial thermal contraction is continued until an axial tensile pre-stress is generated in the intermediate cylinder tube portion.

* * * * *